(12) United States Patent
Kloepfer et al.

(10) Patent No.: US 10,960,440 B2
(45) Date of Patent: Mar. 30, 2021

(54) HIGH-PRESSURE CLEANING APPARATUS

(71) Applicant: Alfred Kärcher GmbH & Co. KG, Winnenden (DE)

(72) Inventors: Juergen Kloepfer, Burgstetten (DE); Markus Fischer, Winnenden (DE); Swen Munz, Welzheim (DE); Timo Spengler, Weil der Stadt (DE)

(73) Assignee: Alfred Kärcher SE & Co. KG, Winnenden (DE)

(*) Notice: Subject to any disclaimer, the term of this patent is extended or adjusted under 35 U.S.C. 154(b) by 461 days.

(21) Appl. No.: 15/630,513

(22) Filed: Jun. 22, 2017

(65) Prior Publication Data

US 2017/0282219 A1  Oct. 5, 2017

Related U.S. Application Data

(63) Continuation of application No. PCT/EP2015/051035, filed on Jan. 20, 2015.

(30) Foreign Application Priority Data

Dec. 23, 2014  (DE) .................... 10 2014 119 555.8

(51) Int. Cl.
*B08B 3/02* (2006.01)
*B05B 7/32* (2006.01)
(Continued)

(52) U.S. Cl.
CPC ............... *B08B 3/026* (2013.01); *B05B 7/32* (2013.01); *B05B 12/006* (2013.01);
(Continued)

(58) Field of Classification Search
CPC .... B08B 3/026; B08B 2203/0205; B05B 7/32
See application file for complete search history.

(56) References Cited

U.S. PATENT DOCUMENTS 3,383,044 A * 5/1968 Norstruden ........... B05B 12/085
  239/126
4,585,168 A * 4/1986 Even ....................... B08B 3/026
  239/74
(Continued)

FOREIGN PATENT DOCUMENTS

CA  1281609 C  3/1991
CN  203926808 U  11/2014
(Continued)

OTHER PUBLICATIONS

DE19521536—Machine Translation (Year: 1996).*
DE4122527—Machine Translation (Year: 1992).*

*Primary Examiner* — Marc Lorenzi
(74) *Attorney, Agent, or Firm* — Womble Bond Dickinson (US) LLP (57) ABSTRACT

A high-pressure cleaning apparatus including a high-pressure pump that includes a suction chamber, at least one pump chamber in which liquid is pressurized, and a pressure chamber arranged downstream of the pump chamber is disclosed. The high-pressure pump includes a return line via which the pressure chamber is in flow communication with the suction chamber, and a valve unit by which a free cross-sectional area of the return line is changeable. The high-pressure cleaning apparatus also includes a drive unit associated with the valve unit, a control unit coupled to the drive unit and a pressure sensor coupled to the control unit for detecting liquid pressure on the pressure side of the pump chamber. Depending on the signal of the pressure sensor, the liquid pressure can be controllable to a predetermined or predeterminable liquid pressure by changing of the free cross-sectional area of the return line.

34 Claims, 7 Drawing Sheets

(51) Int. Cl.
  *G05D 16/20* (2006.01)
  *B05B 12/00* (2018.01)

(52) U.S. Cl.
  CPC .... *G05D 16/202* (2013.01); *B08B 2203/0205* (2013.01); *B08B 2203/0217* (2013.01); *B08B 2203/0229* (2013.01); *B08B 2203/0241* (2013.01); *B08B 2203/0294* (2013.01)

(56) References Cited

U.S. PATENT DOCUMENTS

| | | | |
|---|---|---|---|
| 5,329,956 A | | 7/1994 | Marriott et al. |
| 5,381,962 A | | 1/1995 | Teague |
| 5,558,503 A | | 9/1996 | Weller et al. |
| 7,891,036 B2 | | 2/2011 | Hahn et al. |
| 8,118,241 B2 | | 2/2012 | Gardner et al. |
| 2002/0033185 A1 | * | 3/2002 | Hoenisch ............... B08B 3/026 134/22.12 |
| 2006/0108449 A1 | | 5/2006 | Sodemann et al. |
| 2012/0211034 A1 | | 8/2012 | Nathan et al. |
| 2012/0213652 A1 | | 8/2012 | Nathan et al. |
| 2013/0214059 A1 | | 8/2013 | Gilpatrick et al. |

FOREIGN PATENT DOCUMENTS

| | | | | |
|---|---|---|---|---|
| DE | 27 22 353 | | 11/1978 | |
| DE | 28 41 018 | | 4/1980 | |
| DE | 32 48 622 C2 | | 10/1985 | |
| DE | 4122527 C1 | * | 7/1992 | ............. B08B 3/026 |
| DE | 93 13 929 | | 10/1994 | |
| DE | 19521536 A1 | * | 12/1996 | ............... B05B 7/32 |
| DE | 10 2006 009 855 | | 9/2007 | |
| GB | 1 304 467 | | 1/1973 | |
| JP | S51-36101 U | | 3/1976 | |
| SU | 1275116 | | 12/1986 | |
| SU | 1355758 | | 11/1987 | |

* cited by examiner

FIG.8

HIGH-PRESSURE CLEANING APPARATUS

CROSS REFERENCE TO RELATED APPLICATIONS

This application is a continuation of international application number PCT/EP2015/051035, filed on Jan. 20, 2015, and claims the benefit of German application number 10 2014 119 555.8, filed Dec. 23, 2014, which are incorporated herein by reference in their entirety and for all purposes.

FIELD OF THE INVENTION

The present invention relates to a high-pressure cleaning apparatus comprising a high-pressure pump that comprises a suction chamber, at least one pump chamber which is arranged downstream thereof and in which liquid is pressurized, and a pressure chamber arranged downstream of the pump chamber.

BACKGROUND OF THE INVENTION

A high-pressure pump of the high-pressure cleaning apparatus of the kind mentioned at the outset is for example configured as a piston pump, in particular as an axial piston pump, and customarily comprises two or more pistons which are reciprocatingly movable. Under movement of the pistons, liquid drawn in from the suction chamber is pressurized in the pump chamber and discharged from the high-pressure pump via the pressure chamber. A suction line is in flow communication with the suction chamber, and the pressure chamber is in flow communication with a high-pressure line, in particular a high-pressure hose, and, via said high-pressure line, with a discharge device of the high-pressure cleaning apparatus.

An object underlying the present invention to provide a high-pressure cleaning apparatus of the generic kind that enables more reliable operation.

SUMMARY OF THE INVENTION

In an aspect of the present invention, a high-pressure cleaning apparatus comprises a high-pressure pump that comprises a suction chamber, at least one pump chamber which is arranged downstream thereof and in which liquid is pressurized, and a pressure chamber arranged downstream of the pump chamber. The high-pressure pump comprises a return line via which the pressure chamber is in flow communication with the suction chamber, and a valve unit by which a free cross-sectional area of the return line is changeable. The high-pressure cleaning apparatus comprises a drive unit associated with the valve unit, a control unit coupled to the drive unit and a pressure sensor which is coupled to the control unit and by which a liquid pressure is detectable on the pressure side of the pump chamber. Depending on the signal of the pressure sensor, the liquid pressure is controllable to a predetermined or predeterminable liquid pressure by changing the free cross-sectional area of the return line.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a high-pressure cleaning apparatus comprising a high-pressure pump that comprises a suction chamber, at least one pump chamber which is arranged downstream thereof and in which liquid is pressurized, and a pressure chamber arranged downstream of the pump chamber. The high-pressure pump comprises a return line via which the pressure chamber is in flow communication with the suction chamber, and a valve unit by which a free cross-sectional area of the return line is changeable, wherein the high-pressure cleaning apparatus comprises a drive unit associated with the valve unit, a control unit coupled to the drive unit and a pressure sensor which is coupled to the control unit and by which a liquid pressure is detectable on the pressure side of the pump chamber, and wherein, depending on the signal of the pressure sensor, the liquid pressure is controllable to a predetermined or predeterminable liquid pressure by changing the free cross-sectional area of the return line.

In the high-pressure cleaning apparatus in accordance with the invention, it is possible to control a liquid pressure on the pressure side of the pump chamber. To this end, the high-pressure pump comprises, inter alia, a return line from the pressure chamber to the suction chamber on which the valve unit is arranged or into which the valve unit is connected. The control unit can control the drive unit for actuating the valve unit, whereby the free cross-sectional area of the return line can be changed. The pressure sensor supplies to the control unit a signal which comprises information on the measured liquid pressure on the pressure side of the pump chamber. By comparing the measured liquid pressure with the predetermined or predeterminable liquid pressure, the control unit controls the drive unit for changing the free cross-sectional area of the return line. Depending on the position of the valve unit and different-sized free cross-sectional area associated therewith, liquid can flow from the pressure chamber to the suction chamber and is accompanied by a change of the liquid pressure which can be measured on the pressure side of the pump chamber by way of the pressure sensor. It is found in practice that, by the solution in accordance with the invention, reliable control can be achieved with a structurally simple configuration of the high-pressure pump.

Here, "position of the valve unit" is in particular understood to be the position of a valve body relative to a valve seat of the valve unit, wherein, depending on the relative position, a different-sized free cross-sectional area of the return line is open and the amount of liquid passing through the return line can be adjusted.

Here, "on the pressure side of the pump chamber" is in particular understood to mean that the liquid pressure is detectable at or in a chamber or a liquid line, said chamber or liquid line being located downstream of a pressure valve that separates the pump chamber from the pressure chamber. This can also be understood to be, in particular, a liquid line connected to or opening into the pressure chamber.

It is advantageous for the liquid pressure to be detectable in the high-pressure pump by the pressure sensor.

Preferably, a liquid pressure is detectable at or in the pressure chamber by the pressure sensor. To this end, the pressure sensor is for example arranged at the pressure chamber or at a liquid line opening thereinto.

The liquid pressure detectable by the pressure sensor may for example be the pump pressure of the liquid as is present at a pump outlet of the high-pressure pump, to which outlet the high-pressure line is or can be connected. The liquid pressure may also be a pressure coupled to the pump pressure so that the pump pressure can be determined via a known relation between the liquid pressure and the pump pressure by a measurement of the liquid pressure.

The pump outlet is for example arranged at the pressure chamber or is in flow communication therewith.

The liquid pressure is predeterminable for the control unit via, for example, an input unit of the high-pressure cleaning apparatus. It may be provided that the liquid pressure can be predetermined as an absolute value and/or as a relative value, in particular via a pressure level.

Preferably, the liquid pressure is predeterminable for the control unit in steps, for example via the above-mentioned pressure level.

Alternatively or in addition, provision may be made for the liquid pressure to be continuously predeterminable for the control unit.

Preferably, the free cross-sectional area of the return line is changeable in steps for controlling the liquid pressure. For example, provision may be made for the valve unit to be allowed to assume discrete positions.

Alternatively or in addition, it is advantageous for the free cross-sectional area of the return line to be continuously changeable for controlling the liquid pressure. For example, the valve position of the valve unit can be continuously changed.

Preferably, the valve unit comprises a valve body with which the drive unit is coupled and a valve seat with which the valve body is in sealing or substantially sealing contact when in a closed position and from which the valve body is unseatable to at least one open position for changing the free cross-sectional area of the return line. In the closed position, the return line is for example closed and the pump pressure at its maximum. By unseating the valve body from the valve seat, the free cross-sectional area of the return line can be increased, the amount of liquid flowing through the return line increased and the pump pressure reduced.

Provision may be made for the valve body to be transferrable from the closed position to the at least one open position against the action of an elastic return element. The return element is for example a compression spring which applies to the valve body a closing force in a direction towards the closed position.

It proves advantageous if, in the at least one open position, the change in the free cross-sectional area at the valve seat per length of travel of the valve body relative to the valve seat is dependent on the position of the valve body relative to the valve seat. In particular, it is thereby possible to implement a non-constant characteristic of the valve unit. Depending on what relative position the valve body and the valve seat assume, the free cross-sectional area is changed to a greater extent or to not so great an extent per length of travel. For example, this is advantageous in order to provide for different characteristics of the valve unit for different applications of the high-pressure pump. For example, provision may be made for the free cross-sectional area in the region of one position of the valve unit to change only to a small extent when the valve body is moved relative to the valve seat. This can be provided for controlling different predeterminable liquid pressures. In a different region of the relative position between valve body and valve seat, provision may be made for a greater change in the cross-sectional area to be provided with the relative movement. This can be utilized to provide for a greater change in the volumetric flow rate through the return line and can be linked to an operating mode of the high-pressure pump in which the liquid pressure is no longer controlled but a concentration of a cleaning chemical which is admixable to the liquid is changed at the pump outlet via said change in the volumetric flow rate. This will be explained in more detail hereinafter.

It proves advantageous if, downstream of the valve seat, the return line is oriented transversely to the longitudinal direction of the valve body. For example, liquid flow through the return line is axially in at the valve seat and radially out downstream of the valve seat. The valve body in this case is for example inserted in a fit of the valve unit formed by a valve body receiving part. By providing the change in flow direction from axial to radial flow, a fine adjustment of the free cross-sectional area can be implemented, and this benefits the control of the liquid pressure, even different liquid pressures.

In an advantageous embodiment, the valve body is configured as a valve pin which is movable, and in particular displaceable, in a longitudinal direction in the return line.

It is advantageous for the valve pin to comprise a taper in at least a section thereof and in particular in a direction opposite a direction for transfer from the closed position to the at least one open position. By way of example, a conical taper is provided in at least a section of the valve pin.

Provision may be made for the taper to increase with increasing distance from a valve body sealing section of the valve pin which is in contact against the valve seat when in the closed position. Adjacent to the valve body sealing section, the valve pin has for example a cylindrical or substantially cylindrical contour. Alternatively or in addition, for example at a greater distance from the valve body sealing section, a taper may be provided on the valve body. The taper may increase with increasing distance. This can be understood to mean, in particular, that a change in the cross-sectional area of the valve body increases per distance interval from the valve body sealing section. When the valve pin moves relative to the valve seat, the change in the free cross-sectional area per length of travel can thereby increase with increasing distance of the valve body sealing section from the valve seat.

The drive unit is arranged on the high-pressure pump for example. Provision may be made for the drive unit to engage in a valve chamber which is formed in the high-pressure pump and in which the valve unit is inserted. The drive unit can support the valve unit in the valve chamber and in particular sealingly contact same, whereby the return line can be sealed.

The drive unit may be configured in many different ways. The drive unit is for example an electric, a mechanical, a hydraulic and/or a pneumatic drive unit.

In an advantageous implementation of the high-pressure pump, the drive unit comprises a spindle drive. The electric spindle drive can be actuated under the control of the control unit, and the position of the valve unit can thereby be changed. In particular, the valve body is displaced relative to the valve seat. To this end, the valve body, configured as a valve pin in particular, is for example fixedly coupled to the spindle drive.

It is advantageous for the high-pressure pump to comprise, downstream of the valve unit, at or in the return line, a pressure valve which opens the return line when a threshold pressure is exceeded and which sealingly or substantially sealingly closes the return line below the threshold pressure. Via the pressure valve, the liquid pressure in the return line can be maintained and the return line opened only after the threshold pressure is exceeded. For example, the pressure valve makes it possible, when starting the high-pressure pump in suction operation, to prevent air from being suctioned from the return line when the valve body assumes an open position.

Preferably, the valve unit comprises a valve body receiving part partially forming the return line and comprises a valve body received therein, and the pressure valve is advantageously configured as a valve ring surrounding the valve body receiving part. The valve body receiving part is for example inserted in a bore of a base body of the high-pressure pump and receives the valve body. The valve body receiving part can have an outlet opening which is sealingly or substantially sealingly closeable by the valve ring surrounding it. The valve ring is configured as an O-ring for example.

It is advantageous for the high-pressure pump to comprise an injector arranged in the pressure chamber and a supply line, opening thereinto, for a cleaning chemical that is to be admixed to the liquid, and for the pressure to be detectable in the supply line by the pressure sensor. A cleaning chemical may be added to the pressurized liquid. To this end, the injector, in particular a Venturi injector, can be provided in the pressure chamber. The cleaning chemical can be supplied to the injector via the supply line from a container which can be inserted in a receptacle of the high-pressure cleaning apparatus, and can be mixed with the pressurized liquid. The mixture of liquid and cleaning chemical can be discharged at the pump outlet. In the present embodiment, the liquid pressure is determinable in the supply line by the pressure sensor and the pressure sensor is preferably arranged on the supply line. Based on the pressure in the supply line, for example the pressure in the pressure chamber and/or the pump pressure at the outlet of the high-pressure pump can be inferred. By controlling the liquid pressure in the supply line, it is thereby possible to also control the pressure in the pressure chamber and/or the pump pressure at the pump outlet.

The return line and/or the supply line can also be referred to as a return channel or as a supply channel respectively.

Advantageously, a liquid pressure below a predetermined or predeterminable threshold pressure is detectable by the pressure sensor. For example, a pressure drop is caused by a change in cross-section of a discharge device of the high-pressure cleaning apparatus, which will be described in greater detail below. For example, the liquid pressure drops on the pressure side of the pump chamber when a low-pressure cleaning agent nozzle is connected and operated, which can be detected by the pressure sensor. Said drop can be interpreted by the control unit to the effect that the high-pressure pump assumes a cleaning agent mode in which the cleaning chemical can be suctioned via the injector. The pressure in the supply line is for example less than the ambient pressure of the atmosphere (approximately less than 1 bar).

The high-pressure pump in this case is preferably transferable from a control mode in which the liquid pressure is controlled to a non-control mode in which the liquid pressure is not controlled. In the control mode, the pressure is controlled as described above. The control mode is in particular assumed when a discharge unit in the form of a high-pressure nozzle is provided and when the liquid pressure is to be controlled depending on the predetermination made by a user. The control mode can therefore also be considered as a high-pressure mode in particular. In the high-pressure mode, the liquid pressure exceeds a threshold pressure in particular. In the non-control mode, the high-pressure pump can assume the cleaning agent mode, in which the liquid pressure is not controlled.

It is advantageous for a position of the valve unit to be regulatable by the control unit for changing the free cross-sectional area in the non-control mode depending on a predetermination supplied to the control unit. In the non-control mode, or cleaning agent mode, the position of the valve unit in particular can be predetermined, thereby permitting the free cross-sectional area of the return line to be regulated. This is associated with a change in the volumetric flow rate through the return line. As a result of said change in the volumetric flow rate, the concentration of the cleaning chemical which is suctioned via the injector in the cleaning agent mode can be changed. The mixing ratio between liquid and cleaning chemical can thereby be varied.

Preferably, the valve unit is adjustable in steps.

Alternatively or in addition, provision may be made for the valve unit to be continuously adjustable.

Preferably, the high-pressure cleaning apparatus, in particular the high-pressure pump, comprises a dosing valve by which the dosage of the cleaning chemical and hence the mixing ratio with the liquid can be influenced. The dosing valve is for example coupled to the control unit and/or actuatable depending on a predetermination made by an operator on an input unit. Preferably, the dosing valve is connected into the above-mentioned supply line.

Preferably, the high-pressure cleaning apparatus comprises an input unit which is coupled to the control unit and via which a liquid pressure is predeterminable for the control unit by an operator. The liquid pressure can be controlled with the high-pressure pump. The input unit comprises in particular input elements, for example buttons, keys, switches, rotary switches or the like, which can be actuated by the operator for predetermining the liquid pressure. By way of example, "+" and "−" buttons are provided via which the operator can increase and decrease, respectively, the liquid pressure in steps.

Preferably, the high-pressure cleaning apparatus comprises a display unit at which information associated with the predetermined liquid pressure can be displayed to the operator. For example, the display unit displays what pressure level has been selected by the operator. It is also conceivable for the actual pump pressure which results on the basis of the predetermined liquid pressure to be displayed. As has already been mentioned above, the pump pressure can be different from the liquid pressure but related thereto such that the pump pressure can be determined by the control unit on the basis of the liquid pressure.

In a preferred embodiment, the input unit and the display unit may form or be configured as an integrated input/output unit, in particular as a touch screen.

Preferably, information from the input unit to the control unit and/or from the control unit to the display unit is wirelessly transmittable. For example, a radio communication link is provided for transmitting the information.

Advantageously, the high-pressure cleaning apparatus comprises an admixing device for admixing a cleaning chemical, which admixing device comprises a receptacle for a container holding the cleaning chemical, an injector arranged in the pressure chamber and a supply line from the receptacle to the injector. Via the supply line, the cleaning chemical can be suctioned by the injector and mixed there with the pressurized liquid. Preferably, the liquid pressure is detectable in the supply line by the pressure sensor.

It is advantageous for the high-pressure cleaning apparatus to comprise an operating unit which is in flow communication or can be brought in flow communication with the pressure chamber via a high-pressure line, for example via a pump outlet, and to which is connectable or on which is arranged at least one discharge unit for pressurized liquid, and for the operating unit to comprise the input unit and/or the display unit. The operating unit is for example a high-pressure gun that is connected via a hose line to a pump outlet and, via the latter, to the pressure chamber. Via the input unit, the operator can predetermine the liquid pressure in a user-friendly manner, wherein information can be transferred to the control unit preferably wirelessly.

It is advantageous for a high-pressure nozzle to be provided as a first discharge unit and for a low-pressure cleaning agent nozzle to be provided as a second discharge unit, these being selectively connectable to the operating unit, and/or for the high-pressure cleaning apparatus to comprise a discharge device that is arranged on the operating unit or can be connected thereto and which comprises a high-pressure nozzle and a low-pressure cleaning agent nozzle which can be selectively brought into fluid communication with the high-pressure line. When the high-pressure nozzle is connected or selected, the high-pressure cleaning apparatus, in particular the high-pressure pump, can assume a high-pressure mode, or control mode, in which the liquid pressure is controllable. When the low-pressure cleaning agent nozzle is connected or selected, the high-pressure cleaning apparatus, in particular the high-pressure pump, can assume a cleaning agent mode, or non-control mode, in which the liquid pressure is not controlled. For performing the cleaning agent mode, the high-pressure cleaning apparatus comprises the above-mentioned admixing device in particular.

It is advantageous if, when the low-pressure cleaning agent nozzle is connected or selected in use of the high-pressure cleaning apparatus, for example when the operating unit is being actuated, a drop in the liquid pressure below a predetermined or predeterminable threshold pressure is detectable and if a corresponding indication is can be provided to the operator at an indicating unit of the high-pressure cleaning apparatus.

Preferably, the indication comprises the information that the high-pressure cleaning apparatus, in particular the high-pressure pump, is assuming a cleaning agent mode. For example, a symbol for a cleaning agent nozzle is displayed.

When in the cleaning agent mode, the high-pressure pump preferably assumes a non-control mode in which the liquid pressure is not controlled.

It is advantageous if, when in the cleaning agent mode, a position of the valve unit is regulatable by the operator via the input unit for changing the free cross-sectional area, and in particular if the high-pressure cleaning apparatus comprises an admixing device for admixing a cleaning chemical whose mixing ratio with the pressurized liquid is regulatable depending on the position of the valve unit. Via the input unit, the operator can regulate the mixing ratio or the concentration of the cleaning chemical. For example, the operator can regulate the position of the valve unit and the change in free cross-sectional area associated therewith in steps. The changed volumetric flow rate of the liquid through the return line resulting thereby leads to a changed mixing ratio between the liquid in the pressure chamber and the cleaning chemical.

Preferably, positions of the valve unit and hence the mixing ratio are regulatable in steps.

Alternatively or in addition, provision may be made for positions of the valve unit and hence the mixing ratio to be continuously regulatable.

The indicating unit is preferably the display unit at which information associated with the predetermined position of the valve unit can be displayed to the operator. In particular, a display unit is provided at which information associated with the predetermined liquid pressure is displayed in the high-pressure mode and at which information associated with the mixing ratio between liquid and cleaning chemical can be displayed in the cleaning agent mode. Also, for example, symbols for a high-pressure nozzle or a low-pressure cleaning agent nozzle can be displayed. The visual content of the indication can be changed by the control unit depending on the presence of the high-pressure mode or the cleaning agent mode.

Advantageously, the input unit comprises input elements by which, in the presence of the cleaning agent mode, the position of the valve unit is predeterminable and by which, in the absence of the cleaning agent mode, the liquid pressure is predeterminable. It is thereby possible for the same input elements to be used on the one hand for predetermining the liquid pressure, for example in the high-pressure mode, and, on the other hand, for predetermining the mixing ratio between liquid and cleaning chemical. No separate input elements are necessary.

Figure 1:
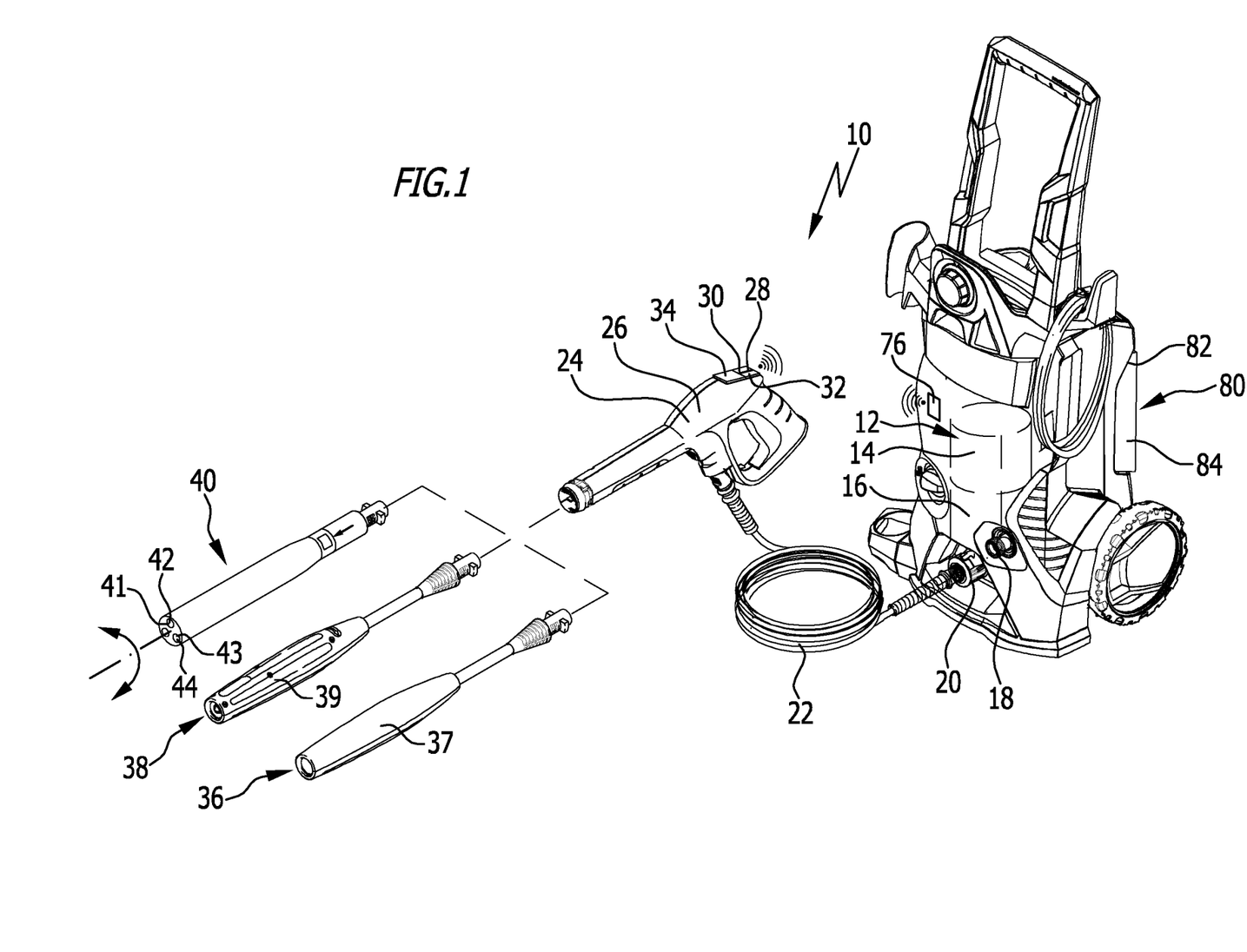
FIG. 1 illustrates, in a perspective view, a high-pressure cleaning apparatus in accordance with the invention, comprising a high-pressure pump.

FIG. 1 shows, in a perspective representation, an advantageous embodiment of a high-pressure cleaning apparatus in accordance with the invention, designated by the reference numeral 10. The high-pressure cleaning apparatus 10 comprises a motor pump unit 12, shown only schematically, comprising a drive motor 14 and a high-pressure pump 16. The high-pressure pump 16 is, for example, flange-mounted to the drive motor 14.

The high-pressure pump 16 comprises a pump inlet 18 to which a supply line for liquid to be pressurized, in particular water, can be connected. Furthermore, the high-pressure pump 16 comprises a pump outlet 20 to which a high-pressure line 22, in the present case a high-pressure hose, for liquid that has been pressurized can be connected.

Connected to the high-pressure line 22 is an operating unit 24 of the high-pressure cleaning apparatus 10 which is configured as a high-pressure gun 26.

Figures 2, 3:
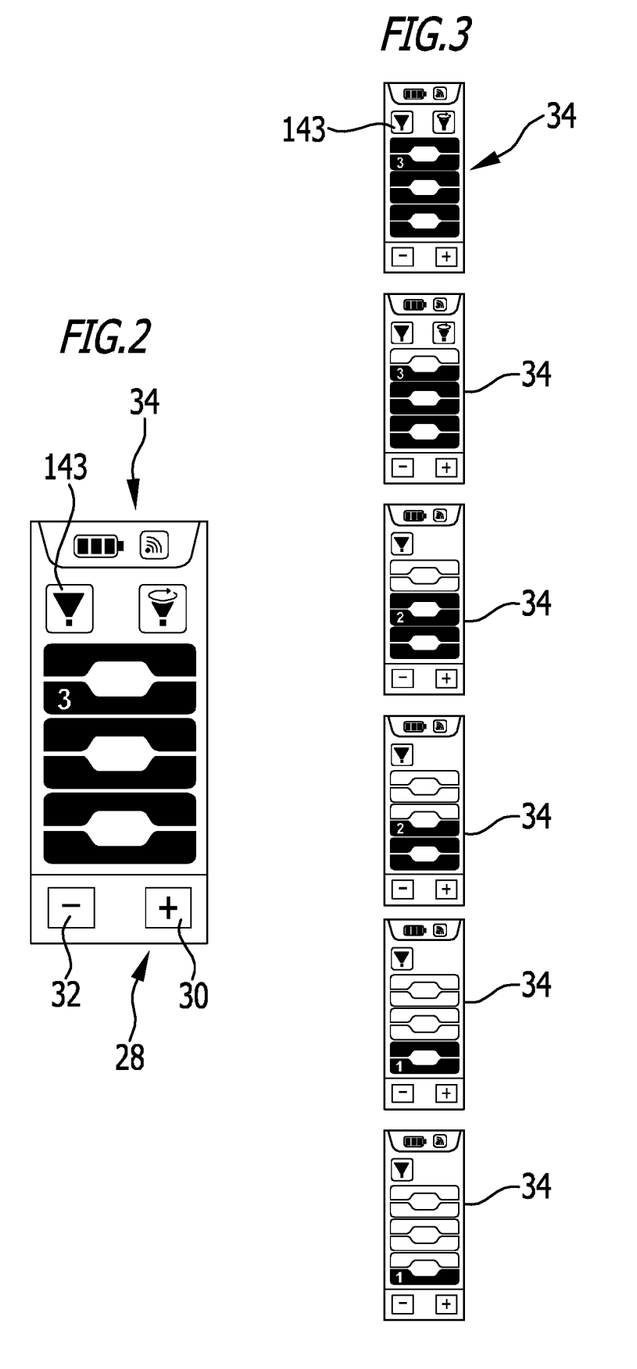
FIG. 2 shows a display unit and an input unit of an operating unit of the high-pressure cleaning apparatus of FIG. 1.
FIG. 3 shows the display unit and the input unit when the high-pressure cleaning apparatus assumes a high-pressure mode, symbolizing six different pressure levels.

Arranged on the high-pressure gun 26 is an input unit 28 comprising input elements for operation by an operator. The input elements comprise in particular a "+" key 30 and a "−" key 32. The high-pressure gun 26 further comprises a display unit 34. The display unit 34 is for example located adjacent to the input unit 28. The input unit 28 and the display unit 34 can also be integrated into each other and configured as, for example, a touch screen. The display unit 34 comprises a visual image display and forms an indicating unit of the high-pressure cleaning apparatus 10. Indications can be visually presented at the display unit 34.

The high-pressure cleaning apparatus 10 comprises a discharge unit 36 in the form of a low-pressure cleaning agent nozzle 37. Furthermore, the high-pressure cleaning apparatus 10 comprises a discharge unit 38 in the form of a high-pressure nozzle 39. Alternatively or in addition, the high-pressure cleaning apparatus 10 may further comprise a discharge device 40 that comprises a plurality of discharge units. In particular provided are a discharge unit 41 configured as a low-pressure cleaning agent nozzle 42 and a discharge unit 43 configured as a high-pressure nozzle 44.

The operator can selectively connect to the high-pressure gun 26 and bring into fluid communication therewith the discharge unit 36, the discharge unit 38 or the discharge device 40. In the case of the discharge device 40, the operator can selectively select and thereby bring into fluid communication with the high-pressure line 22 the low-pressure cleaning agent nozzle 42 or the high-pressure nozzle 44.

Depending on which particular discharge unit is connected or selected, a different cross-section through which the pressurized liquid exits is provided on the output side. The high-pressure nozzles 39 and 44, with small cross-sectional area, have cleaning liquid exiting at a high pressure and rather low volumetric flow rate. In contrast thereto, the low-pressure cleaning agent nozzles 37 and 42 have a considerably larger opening cross-section and liquid exits therefrom at a high volumetric flow rate and rather low pressure.

Through the selection of a high-pressure nozzle 39 or 44 on the one hand and a low-pressure cleaning agent nozzle 37 or 42 on the other hand, the operator, in operation of the high-pressure cleaning apparatus 10 when the operating unit 24 is being actuated, influences the pressure at the outlet of the respective nozzle. This also influences the pressure in the high-pressure line 22 and on the output side of the high-pressure pump 16.

Figure 5:
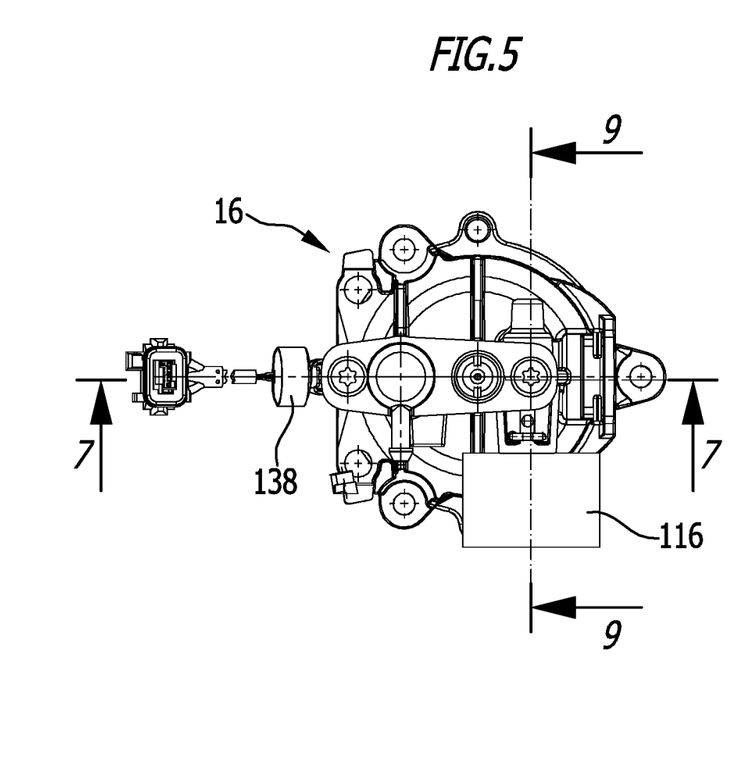
FIG. 5 shows a top view of the high-pressure pump of the high-pressure cleaning apparatus of FIG. 1.
Figure 6:
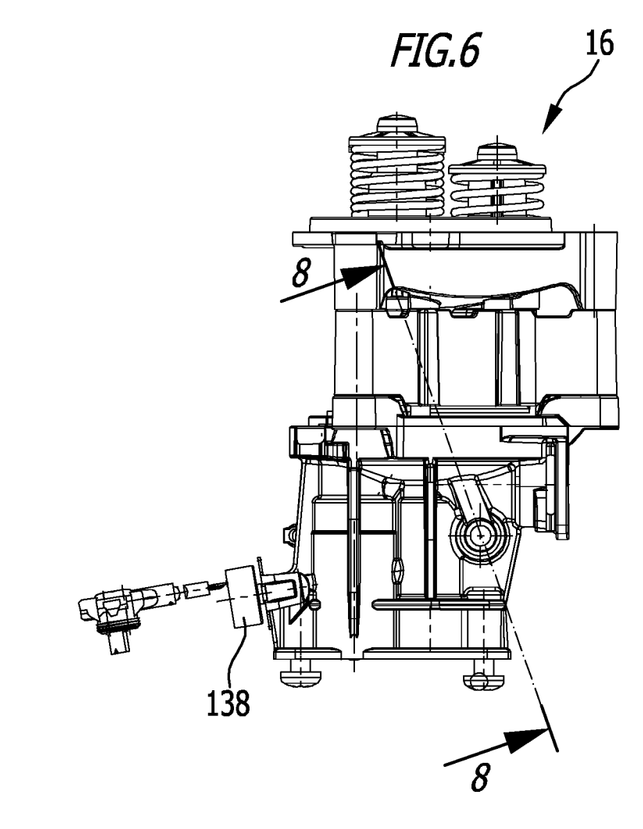
FIG. 6 shows the high-pressure pump in a side view.
Figure 7:
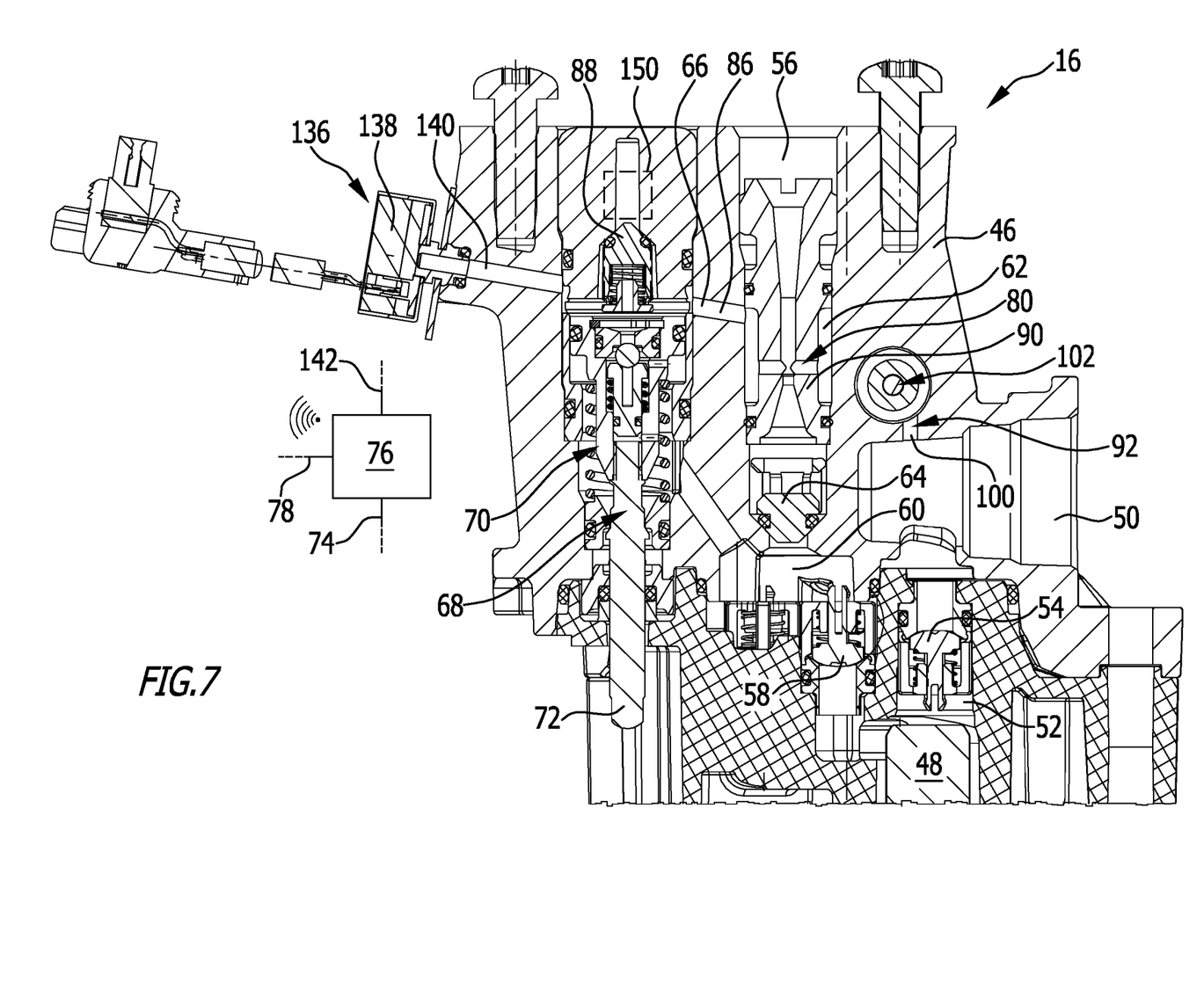
FIG. 7 is a (partial) sectional view along line 7-7 in FIG. 5.

As can be seen from FIGS. 5 to 7 in particular, the high-pressure pump 16 is configured as a piston pump and in particular as an axial piston pump. The high-pressure pump 16 comprises a base body 46 in which a plurality of axial pistons (one axial piston 48 being shown) are supported for linear displacement. The drive motor 14 comprises a swash plate, not illustrated in the drawing, whose rotation moves the axial pistons 48.

The high-pressure pump 16 comprises a suction chamber 50 which is in flow communication with or forms the pump inlet 18. The suction chamber 50 opens into a pump chamber 52, with a suction valve 54 being interposed therebetween. Suctioned liquid can enter the pump chamber 52 and is pressurized therein by the axial pistons 48.

The pump chamber 52 opens into a pressure chamber 56, with a pressure valve 58 being interposed therebetween.

The pressure chamber 56 is divided into a first chamber region 60 and a second chamber region 62. Liquid flowing out of the pump chamber 52 enters the first chamber region 60. Inserted between the chamber regions 60, 62 is a non-return valve 64. In operation of the high-pressure pump 16, the non-return valve 64 can assume an open position and liquid flows through the chamber regions 60 and 62 to the pump outlet 20. The pump outlet 20 is formed by the pressure chamber 56 on the output side thereof or is in flow communication therewith.

An advantageous embodiment of the high-pressure pump, such as the high-pressure pump 16, comprises what is known as an unloader with an unloader valve arranged therein. In this respect, reference is made to FIG. 7.

Opening into the pressure chamber 56, at the second chamber region 62, is a control line 66. The control line 66 can also be referred to as a control channel.

Liquid in the pressure chamber 56 can thereby apply pressure to the unloader valve 68 of an unloader 70. In operation of the high-pressure cleaning apparatus 10 when the high-pressure gun 26 is no longer actuated, this causes a pressure surge via the high-pressure line 22 and into the pressure chamber 56. The pressure surge causes the unloader valve 68 to be acted upon via the control line 66 in a manner known per se. This causes the unloader valve 68 to open and a valve plunger 72 of the unloader 70 to be displaced.

The valve plunger 72 can actuate a switch element, not illustrated in the drawing, which may be a microswitch for example. The switch element communicates via a signal line 74 with a control unit 76 of the high-pressure pump 16. Alternatively, the switch element can operatively communicate with the drive motor 14 directly. In the presence of a switch signal, the control unit 76 can turn off the drive motor 14 via a control line 78 (or the switch element) so that driving the high-pressure pump 16 is ceased when actuation of the high-pressure gun 26 is ceased. When the high-pressure gun 26 is actuated again, the drive motor 14 is reactivated.

The high-pressure cleaning apparatus 10 comprises an admixing device 80 in order to admix a cleaning chemical to the pressurized liquid. Admixing the cleaning chemical is provided for operation using the low-pressure cleaning agent nozzles 37 and 42. The admixing device 80 comprises a receptacle 82 on the high-pressure cleaning apparatus 10 for receiving a container 84 in which the cleaning chemical is stored. The receptacle 82 is in flow communication with the pressure chamber 56 via a supply line 86, sections of which are comprised by the base body 46. Preferably, the control line 66 forms a section of the supply line 86. A non-return valve 88 is connected into the supply line 86, for example near the unloader 70.

The supply line 86 can also be referred to as a supply channel.

The admixing device 80 further comprises an injector 90 which in the present case is configured as a Venturi injector. The injector 90 is arranged in the pressure chamber 56, in particular in the second chamber region 62. The supply line 86 opens into the suction side of the injector 90 in the second chamber region 62.

When, based on the large cross-sections of the low-pressure cleaning agent nozzles 37 and 42, the pressure at the output side is low, the liquid pressure in the supply line 86 drops by virtue of the suction effect of the injector 90 to such an extent that the non-return valve 88 opens. In particular, a pressure below the ambient pressure of the atmosphere (approximately less than 1 bar) prevails in the supply line 86. The cleaning chemical, by virtue of the suction effect of the injector 90, can flow via the supply line 86 into the injector 90 and is admixed to the liquid. The mixture of liquid and cleaning chemical flows to the low-pressure cleaning agent nozzle 37, 42 and can be discharged via same.

On the other hand, when the high-pressure nozzle 39 or 44 is connected to the high-pressure gun 26, the pressure in the high-pressure line 22, and hence in the pressure chamber 56, is high enough for the suction effect of the injector 90 not to occur. The pressure in the supply line 86 is also high, the non-return valve 88 remains closed and cleaning chemical is not drawn in.

Through connection or selection of a low-pressure cleaning agent nozzle 37, 42, the high-pressure cleaning apparatus 10, and in particular the high-pressure pump 16, can thereby be transferred to a cleaning agent mode. Conversely, if the high-pressure nozzle 39 or 44 has been connected or selected, the high-pressure cleaning apparatus 10, and in particular the high-pressure pump 16, assumes a high-pressure mode.

Figure 8:
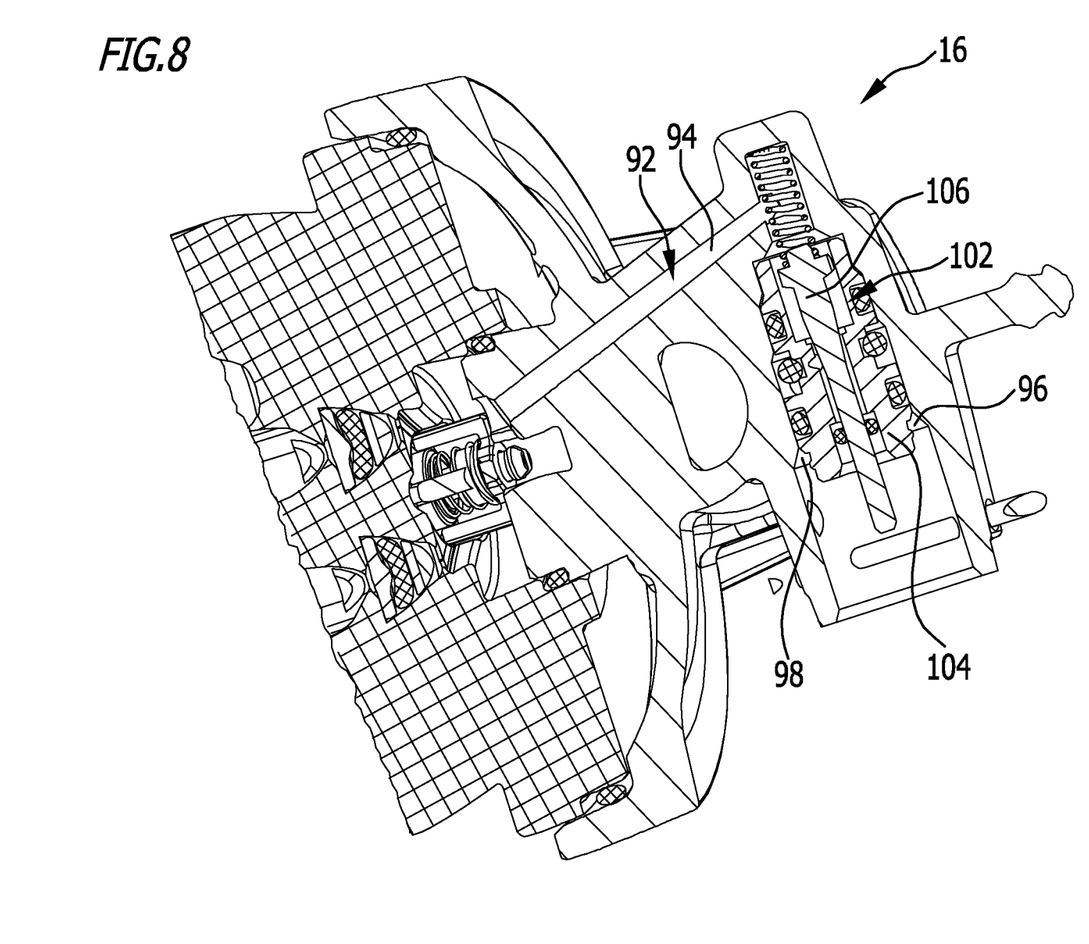
FIG. 8 is a (partial) sectional view along line 8-8 in FIG. 6.

As can be seen from FIGS. 7 to 12 in particular, the high-pressure pump 16 comprises a return line 92. Via the return line 92, the pressure chamber 56 is in flow communication with the suction chamber 50. The return line 92 comprises a first section formed in the base body 46, said first section opening into the pressure chamber 56 and in particular into the first chamber region 60 thereof (FIG. 8). Adjoining the first section 94 is a second section 96 which forms a valve chamber 98. Adjoining the valve chamber 98 is a third section 100 which opens into the suction chamber 50 (FIG. 7). The second and third sections 96, 100 are also formed in the base body 46.

The return line 92 can also be referred to as a return channel.

Figure 9:
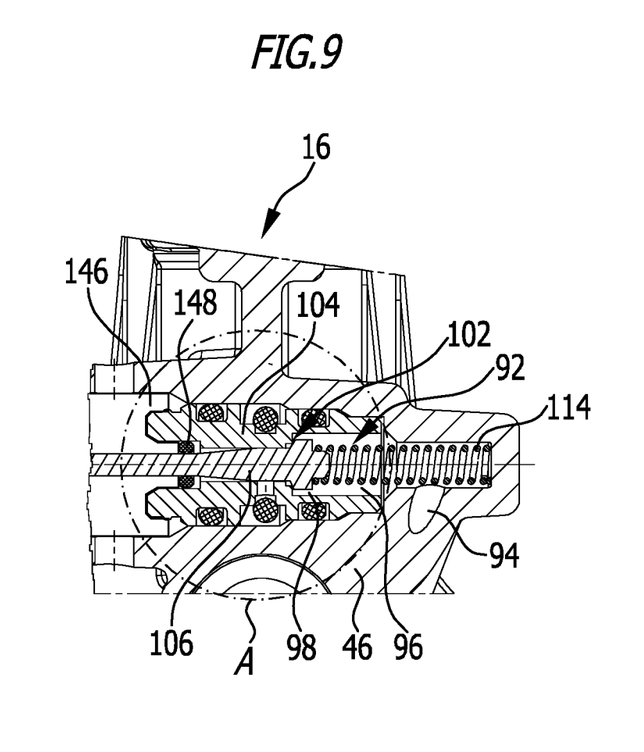
FIG. 9 is a (partial) sectional view along line 9-9 in FIG. 5, with a valve unit of the high-pressure pump assuming a closed position.
Figure 10:
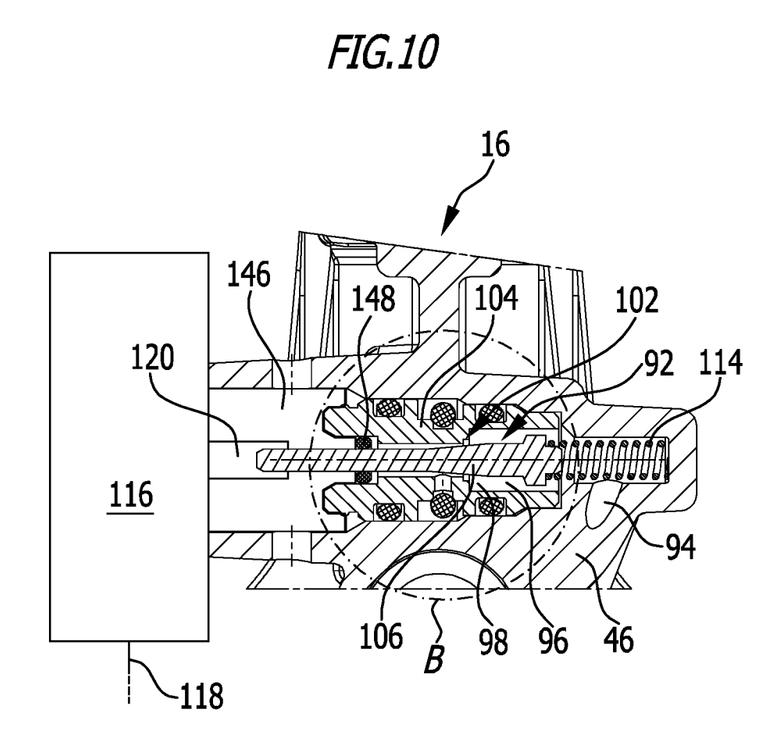
FIG. 10 is a representation corresponding to FIG. 9, with the valve unit assuming an open position, further showing a drive device that is associated with the valve unit.

The high-pressure pump 16 comprises a valve unit 102 via which the free cross-sectional area of the return line 92 can be changed. The valve unit 102 comprises a valve body receiving part 104 which is inserted in the valve chamber 98, and a valve body 106. The valve body 106 is configured as a valve pin 108.

Figure 11:
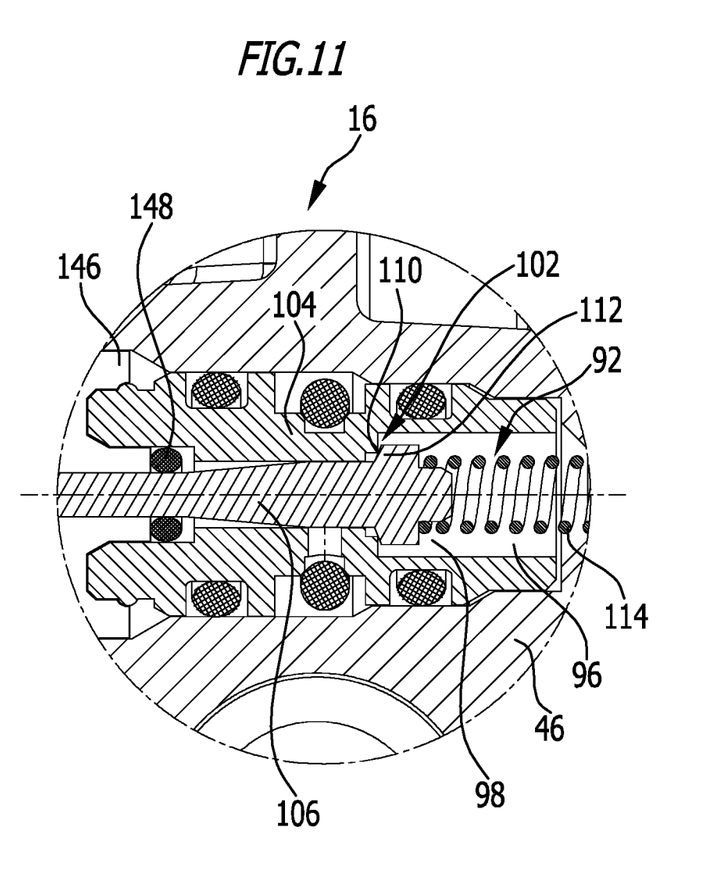
FIG. 11 is an enlarged representation of detail A in FIG. 9.

The valve body receiving part 104 forms a valve seat 110 for the valve pin 108. The valve pin 108 can, at a valve body sealing section 112, sealingly or substantially sealingly contact the valve seat 110 when in a closed position (FIGS. 9 and 11). The return line 92 is closed.

An elastic element in the form of a coil spring 114 applies to the valve pin 108 a force directed towards the closed position thereof.

The high-pressure pump 16 comprises a drive unit 116 which is associated with the valve unit 102. In the present case, the drive unit 116 is configured as an electric drive unit in particular and is in electrical connection with the control unit 76 via a control line 118. The control unit 76 can control the drive unit 116 in order to move the valve pin 108 from the closed position to at least one open position and vice versa. In particular, the valve pin 108 can be displaced in the return line 92 and relative to the valve body receiving part 104. Transferring the valve pin 108 from the closed position to the at least one open position is realized against the closing force of the coil spring 114.

The drive unit 116 is only schematically illustrated in the drawing (in FIGS. 5 and 10). By way of example, the drive unit 116 comprises a spindle drive. The spindle drive can impart linear movement to a plunger 120 which is coupled and, for example, fixedly connected to the valve pin 108.

The plunger 120 is arranged on the side of the valve pin 108 facing away from the coil spring 114.

The drive unit 116 may comprise a holding projection 146 which engages in the base body 46. Via the holding projection 146, the valve unit 102 can be held in the valve chamber 98. For example, the holding projection 146 is inserted in the valve body 106 in a force-locking and/or form-locking manner. The valve unit 102 can be supported on the holding projection 146 against the pressure in the return line 92 acting on it.

Preferably, a sealing element 148 can be supported via the holding projection 146. The sealing element 148 seals between the valve chamber 98 and the holding projection 146. For example, the sealing element 148 is configured as an O-ring surrounding the valve pin 108.

The valve body sealing section 112 is for example formed on an annular collar 122 on which is supported the coil spring 114 on the opposite side.

Figure 12:
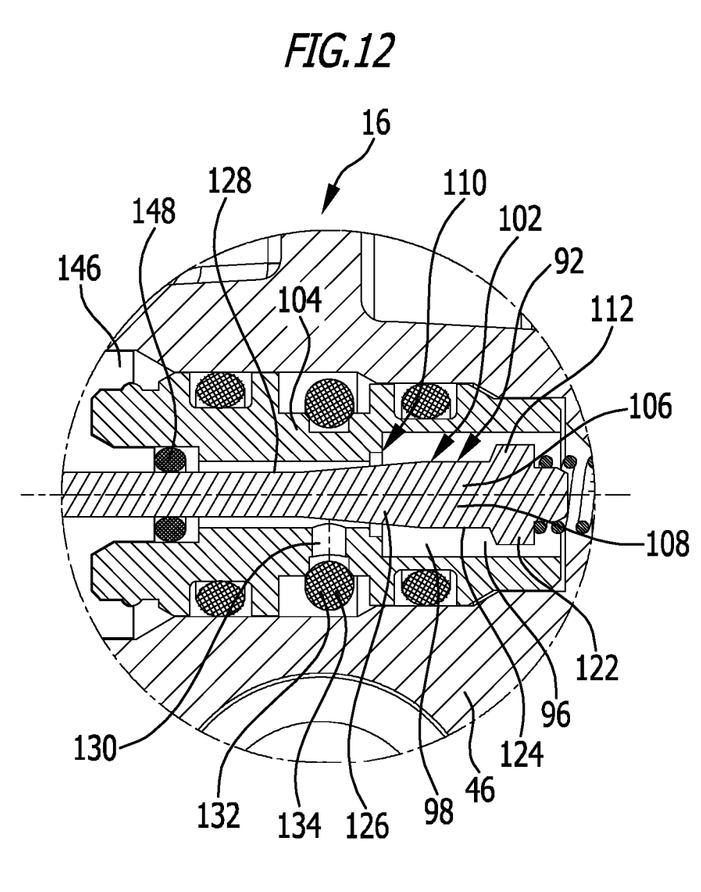
FIG. 12 is an enlarged representation of detail B in FIG. 10.

Starting from the valve body sealing section 112, the valve pin 108 comprises at first a first, cylindrical section 124 and, following this, a second, conical section 126. The cylindrical section 124 is dimensioned such that the valve pin 108 is arranged in the valve body receiving part 104 with some clearance. When the valve pin 108 unseats from the valve seat 110, liquid can flow through the return line 92.

The conical section 126 has a conically tapered configuration; in particular, the valve pin 108 has a double-cone taper. The taper increases with increasing distance from the valve body sealing section 112. Here, this can be taken to mean in particular that the change in diameter, and hence cross-section, of the valve pin 108 increases per length of travel or section of length of the valve pin 108. In the direction opposite to the direction of transferring the valve pin 108 from the closed position to the at least one open position, the valve pin 108 therefore has a taper that increases with increasing distance from the valve body sealing section 112.

In particular, this makes it possible, when in the at least one open position, to render the change in free cross-sectional area of the return line 92 at the valve seat 110 per length of travel of the valve pin 108 relative to the valve seat 110 dependent on the position of the valve pin 108 relative to the valve seat 110. In particular, the change in the free cross-sectional area increases with increasing distance of the valve body sealing section 112 from the valve seat 110 due to the increasing taper of the valve pin 108.

Adjoining the conical section 126, at a greater distance from the valve body sealing section 112 than the conical section 126, is further a cylindrical section 128 of the valve pin 108 whose diameter is less than that of the cylindrical section 124. The sealing element 148 surrounds the cylindrical section 124.

At the valve pin 108, the liquid flows through the return line 92 axially past the valve seat 110 (in a longitudinal direction of the valve pin 108) and thereafter, downstream of the valve seat 110, flows radially away from the valve pin 108. Hence, downstream of the valve seat 110, the return line 92 is oriented radially relative to the longitudinal direction of the valve pin 108. To this end, the valve body receiving part 104 has a passageway 130 formed into the third section 100.

Downstream of the valve unit 102, a pressure valve 132 is provided in the return line 92. The pressure valve 132 is configured as a valve ring 134, in particular as an O-ring. The valve ring 134 surrounds the valve body receiving part 104 and can sealingly or substantially sealingly close the passageway 130 and hence the return line 92. When the pressure in the return line 92 exceeds a threshold pressure, the pressure valve 132 opens. When the pressure is below a threshold pressure, the return line 92 is closed.

The purpose of the pressure valve 132 is that during startup of the high-pressure pump 16, a suction operation (liquid is drawn in at the pump inlet 18 which is not connected to a pressure line) can be performed even when the valve pin 108 assumes an open position. The pressure valve 132 in this case prevents air from being drawn in via the return line 92.

The high-pressure pump 16 further comprises a detection unit 136. With the detection unit 136, it can be detected when a liquid pressure on the pressure side of the pump chamber 52 falls below a threshold pressure. It can be further detected via the detection unit 136 when a threshold pressure is exceeded.

Preferably, the falling below or the exceeding of a threshold pressure can be detected in the high-pressure pump 16 and preferably at or in the pressure chamber 56, in particular in a liquid line connected thereto or opening thereinto. In an advantageous embodiment of the high-pressure pump, the detection unit 136 comprises or is configured as a pressure sensor 138 by which the liquid pressure can be measured.

The pressure sensor 138 is arranged on the high-pressure pump 16 in such a manner that a liquid pressure can be detected in the supply line 86 which opens into the pressure chamber 56. The pressure in the supply line 86 is related to the pump pressure of the high-pressure pump 16 that is present at the pump outlet 20. Via the detection of the liquid pressure in the supply line 86 at the pressure chamber 56, the pump pressure can thereby also be inferred.

The pressure sensor 138 is for example connected to a measurement line 140 which is an extension of the control line 66. The pressure sensor 138 communicates with the control unit via a signal line 142 in order to provide to the control unit a signal corresponding to the liquid pressure. The measuring line 140 can also be referred to as a measuring channel.

The principle of operation of the high-pressure cleaning apparatus 10 and of the high-pressure pump 16 will be explained in the following.

As mentioned previously, provision is made for a high-pressure mode on the one hand and a cleaning agent mode on the other hand. In the high-pressure mode, the liquid pressure at the pressure chamber 56 detectable by the pressure sensor 138 is controlled. In the cleaning agent mode, the valve unit 102 is controlled in order to regulate the volumetric flow rate of the liquid to be delivered and, hence, to regulate the dosage of the cleaning chemical.

When a high-pressure nozzle 39 or 44 is connected or selected, a high pressure prevails in the pressure chamber 56, and hence in the supply line 86, when the operating unit 24 is being actuated. The operator predetermines a pressure level via the "+" 30 and "−" 32 keys. Each pressure level corresponds to a pump pressure at the pump outlet 20 and hence to a liquid pressure in the supply line 86 that is related thereto.

For example, FIG. 3 shows the display unit 34 in high-pressure mode in different pressure levels, decreasing from top to bottom. A total of six different pressure levels are provided that can be selected by the operator using the keys 30 and 32. Actuating the "+" key 30 increases the pressure and actuating the "−" key 32 decreases the pressure.

The predetermination made by the operator is wirelessly transmitted from the input unit 28 to the control unit 76 coupled thereto. The control unit 76 actuates the drive unit 116. By actuating the drive unit 116, the liquid pressure that is detected by the pressure sensor 138 is controlled depending on the operator's predetermination. The high-pressure cleaning apparatus 10, and in particular the high-pressure pump 16, assumes a control mode.

The fact that the high-pressure mode is assumed can be determined by the control unit 76 by the pressure sensor 138 detecting a liquid pressure in the supply line 86 that is above a threshold pressure. If the high-pressure mode is assumed, the display unit 34 presents for example a symbol 143 for a high-pressure nozzle. Also presented is information that is associated with the predetermination by the operator. This comprises representations of the pressure levels symbolized by black lines or bars.

Information for changing the display unit 34 can be wirelessly transmitted from the control unit 76 to the display unit 34 coupled thereto.

For example, at the highest pressure level (at the top of FIG. 3), the return line 92 is closed and the valve body sealing section 112 sealingly contacts the valve seat 110 (FIGS. 9 and 11). By decreasing the pressure level, the position of the valve unit 108 is changed by transferring the valve pin 102 to an open position. This increases the free cross-sectional area of the return line 92, liquid flows from the pressure chamber 56 to the suction chamber 50 and the pump pressure at the pump outlet 20 is reduced. This is detected via the pressure in the supply line 86. The pressure in the supply line 86 is controlled by controlling the drive unit 116.

The same applies for further reductions of the pressure levels, wherein, depending on the particular pressure level, the valve pin 108 is transferred to an open position in which the free cross-sectional area of the return line 92 increases further, the volumetric flow rate through the return line 92 is increased and the pump pressure at the pump outlet 20 is reduced. The liquid pressure is controlled at the respective pressure level.

When the valve pin 108 is transferred to an open position, the pressure valve 132 opens so that flow is permitted through the return line 92.

In the control mode, the valve pin 108 is not displaced by the drive unit 116 by the total possible amount of its length of travel for implementing the lowest pressure level. For example, the valve pin 108 is displaced along the conical section 126 adjoining the cylindrical section 124 only to the extent that the conicity of the section 126 does not change. This corresponds to the region of constant taper of the conical section 126 and to a change in free cross-sectional area of the return line 92 per length of travel that is constant.

If a low-pressure cleaning agent nozzle 37 or 42 is connected or selected, the large opening cross-section causes the pressure in the supply line 86 to drop when the operating unit 24 is being actuated. It can thereby be detected by the pressure sensor 138 that the liquid pressure at the pressure chamber 56 has fallen below a threshold pressure. The control unit 76 analyzes the signal of the pressure sensor 138 and can determine that the cleaning agent nozzle 37 or 42 is used. The control unit 76 switches to a cleaning agent mode. A corresponding indication is wirelessly transmitted to the display unit 34. In particular, a symbol 144 for a low-pressure cleaning agent nozzle is presented.

Figure 4:
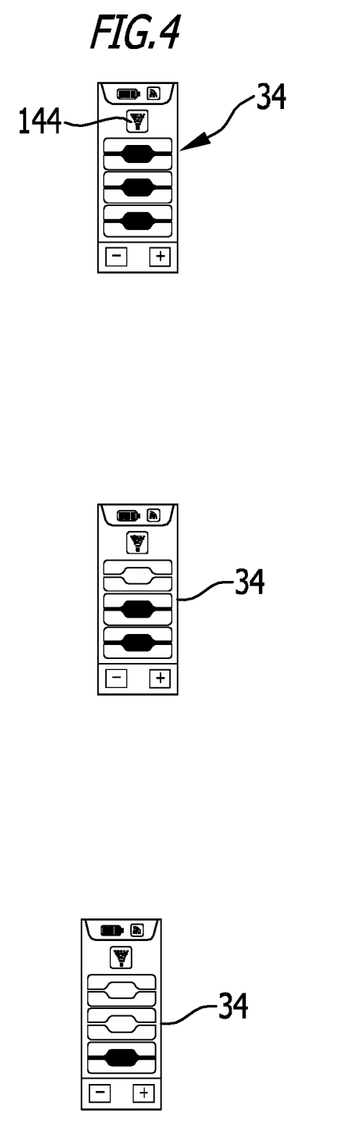
FIG. 4 shows the display unit and the input unit when the high-pressure cleaning apparatus assumes a cleaning agent mode, symbolizing three different dosages of a cleaning chemical.

The display unit 34 changes the image display from the high-pressure mode represented in FIG. 3 to the cleaning agent mode represented in FIG. 4.

In the cleaning agent mode, the high-pressure cleaning apparatus 10, and in particular the high-pressure pump 16, assumes a non-control mode. The liquid pressure detected by the pressure sensor 138 is no longer controlled.

Instead, the operator controls the position of the valve unit 102 via the "+" 30 and the "−" 32 keys. As a result, in particular, the operator controls the free cross-sectional area of the return line 92 and the volumetric flow rate therethrough.

In the non-control mode, the valve unit 102 opens and the increased volumetric flow rate through the return line 92 causes a change in volumetric flow rate at the pump outlet 20. Because cleaning chemical is simultaneously drawn into the injector 90 via the supply line 86, the mixing ratio between the liquid and the cleaning chemical changes.

The operator can change the mixing ratio in steps via the keys 30 and 32. A total of three different mixing ratios can be adjusted in steps; the respective image display of the display unit 34 is shown in FIG. 4. Different mixing ratios are for example symbolized by different numbers of lines or bars. At the top of FIG. 4 is shown the situation of maximum dosage of the cleaning chemical, i.e. a high mixing ratio between the cleaning chemical and the liquid (high cleaning chemical content). The mixing ratio between the cleaning chemical decreases towards the bottom.

It is further apparent from FIGS. 3 and 4 that the image displays of the display unit 34 in the high-pressure mode and in the cleaning agent mode are at least partially "inverted". In the high-pressure mode, the pressure levels are symbolized by bars having interspaces therebetween, while in the cleaning agent mode, bars displayed within said interspaces symbolize the mixing ratio between the cleaning chemical and the liquid.

The predetermination made by the user via the keys 30 and 32 is implemented by the control unit 76 for controlling the drive unit 116. The drive unit 116 displaces the valve pin 108 far enough for the free cross-sectional area of the return line 92 to be changed depending on the selected cleaning chemical dosage (mixing ratio).

It is further apparent from FIGS. 3 and 4 that the presentation on the display unit 34 for the pressure level on the one hand (FIG. 3) and the mixing ratio on the other hand (FIG. 4) reflects the opposed positions of the valve unit 102 and free cross-sectional areas of the return line 92 associated therewith. When in the high-pressure mode, the valve unit 102 is closed at a high pressure level (indicated at top of FIG. 3) and is open at a low pressure level (indicated at bottom of FIG. 3). By contrast, when in the cleaning agent mode, the valve unit 102 is open wider when the cleaning chemical content is high (indicated at top of FIG. 4) than is the case when the cleaning chemical content is low (indicated at bottom of FIG. 4).

In particular, the valve pin 108 in the cleaning agent mode is displaced far enough for the change in free cross-sectional area to be realized via the increasing taper of the conical section 126. Therefore, the extent to which the free cross-sectional area changes per length of travel of the valve body 106 is larger than is the case per length of travel in the high-pressure mode.

When a high-pressure nozzle 39 or 44 is again connected or selected, the pressure sensor 138, when the operating unit 24 is being actuated, again detects that the pressure in the supply line 86 again exceeds the first-mentioned threshold pressure. The high-pressure cleaning apparatus 10 switches to the high-pressure mode, which has already been explained above.

The threshold pressures above which the high-pressure mode is detected or below which the cleaning agent mode is detected may preferably be identical.

The geometry of the valve pin 108 which has a double-cone section 126 in particular provides a way of reliably ensuring the different adjustment of the pressure levels and the control of the liquid pressure when in the high-pressure mode. In the cleaning agent mode, said geometry allows for the volumetric flow rate of the liquid through the return line 92 and hence the mixing ratio between the cleaning chemical and the liquid to be reliably adjusted. Therefore, the subdivisions "control region" for the high-pressure mode and "regulating region" of the valve pin 108 allow for reliable operation of the high-pressure pump 16 in both the control mode and the non-control mode.

The high-pressure cleaning apparatus 10 and the high-pressure pump 16 allow switching between control of the liquid pressure and regulation of the dosage (mixing ratio) of the cleaning chemical depending on what particular discharge unit is selected or connected in each case. The input unit 28 for selecting the pressure level and for selecting the mixing ratio is the same. Depending on the operating mode, the display unit 34 presents the pressure levels or the levels for the mixing ratio. The high-pressure cleaning apparatus 10 is therefore also distinguished by being particularly user-friendly and intuitive to use.

Alternatively or in addition to the return line 108 and to the valve unit 102 and the drive unit 116, provision may be made for the high-pressure pump to comprise a valve 150 via which the dosing of the cleaning chemical and hence the mixing ratio with the liquid can be influenced. Such a dosing valve 150 is for example connected into the supply line 86. For example, FIG. 7 shows the arrangement of the dosing valve 150, preferably upstream of the non-return valve 88 relative to the direction of flow of the cleaning chemical.

The dosing valve 150 can be actuated or adjusted by hand. It is also conceivable for the dosing valve 150 to be controlled by the control unit 76 depending on the predetermination made by the operator on the input unit 28.

In the high-pressure cleaning apparatus 10, control of the liquid pressure in the high-pressure mode is preferably realized only when the drive motor 14 is in operation. This can be determined by the control unit 76 for example. It is thereby possible to avoid unnecessary pressure control with the drive motor 14 turned off and consequent change in the liquid pressure which is detected by the pressure sensor 138.

Correspondingly, the operating mode is switched between the high-pressure mode and the cleaning agent mode and vice versa preferably only when the drive motor 14 is in operation, and so also the operating mode-dependent content of the display unit 34.

The invention claimed is:

1. A high-pressure cleaning apparatus comprising:
    a high-pressure pump, the pump comprising a pump inlet for connecting a supply conduit to supply a liquid, and a pump outlet;
    a high-pressure line connected to the pump outlet;
    an operating unit comprising a high-pressure gun connected to the high-pressure line;
    a drive unit;
    a control unit coupled to the drive unit;
    a pressure sensor coupled to the control unit;
    the pump further comprising:
        a suction chamber;
        at least one pump chamber which is arranged downstream of the suction chamber and in which liquid is pressurized;
        a pressure chamber arranged downstream of the pump chamber, with a pressure valve being interposed between the pump chamber and the pressure chamber, the pressure chamber having a first chamber region and a second chamber region downstream thereof, a non-return valve being disposed between the first chamber region and the second chamber region;
an injector arranged in the second chamber region and a supply line, opening thereinto, for a cleaning chemical that is to be admixed to the liquid, and wherein the pressure is detectable in the supply line by the pressure sensor;
a return line via which the first chamber region of the pressure chamber is in flow communication with the suction chamber; and
a valve unit by which a free cross-sectional area of the return line is changeable, the drive unit being associated with the valve unit;
wherein:
a liquid pressure is detectable on the pressure side of the pump chamber by the pressure sensor, and depending on the signal of the pressure sensor, the liquid pressure is controllable to a predetermined or predeterminable liquid pressure by changing of the free cross-sectional area of the return line.

2. The high-pressure cleaning apparatus in accordance with claim 1, wherein the liquid pressure is detectable at or in the pressure chamber.

3. The high-pressure cleaning apparatus in accordance with claim 1, wherein the liquid pressure is predeterminable for the control unit in steps or continuously.

4. The high-pressure cleaning apparatus in accordance with claim 1, wherein the free cross-sectional area of the return line is changeable in steps or continuously for controlling the liquid pressure.

5. The high-pressure cleaning apparatus in accordance with claim 1, wherein the valve unit comprises a valve body with which the drive unit is coupled and a valve seat, the valve body being in sealing contact with the valve seat when in a closed position and the valve body being unseatable from the valve seat to at least one open position for changing the free cross-sectional area of the return line.

6. The high-pressure cleaning apparatus in accordance with claim 5, wherein the valve body is transferrable from the closed position to the at least one open position against the action of a compression spring.

7. The high-pressure cleaning apparatus in accordance with claim 5, wherein the change in the free cross-sectional area of the return line at the valve seat increases with increasing distance of a valve body sealing section of the valve body from the valve seat, and wherein the valve body sealing section is in contact against the valve seat when in the closed position.

8. The high-pressure cleaning apparatus in accordance with claim 5, wherein downstream of the valve seat, the return line is oriented transversely to a longitudinal direction of the valve body.

9. The high-pressure cleaning apparatus in accordance with claim 5, wherein the valve body is configured as a valve pin which is displaceable, in a longitudinal direction in the return line.

10. The high-pressure cleaning apparatus in accordance with claim 9, wherein the valve pin comprises a taper in at least a section thereof.

11. The high-pressure cleaning apparatus in accordance with claim 10, wherein the taper increases with increasing distance from a valve body sealing section of the valve pin which is in contact against the valve seat when in the closed position.

12. The high-pressure cleaning apparatus in accordance with claim 1, wherein the drive unit is an electric, a mechanical, a hydraulic or a pneumatic drive unit.

13. The high-pressure cleaning apparatus in accordance with claim 12, wherein the drive unit comprises a spindle drive.

14. The high-pressure cleaning apparatus in accordance with claim 1, wherein the high-pressure pump comprises, downstream of the valve unit, at or in the return line, an additional pressure valve which opens the return line when a threshold pressure is exceeded, the additional pressure valve sealingly closing the return line below the threshold pressure.

15. The high-pressure cleaning apparatus in accordance with claim 14, wherein the valve unit comprises a valve body receiving part partially forming the return line and comprises a valve body of the valve unit received therein, and wherein the additional pressure valve is configured as a valve ring surrounding the valve body receiving part.

16. The high-pressure cleaning apparatus in accordance with claim 1, wherein a liquid pressure below a predetermined or predeterminable threshold pressure is detectable by the pressure sensor.

17. The high-pressure cleaning apparatus in accordance with claim 1, wherein the valve unit is adjustable in steps or continuously.

18. The high-pressure cleaning apparatus in accordance with claim 1, wherein the high-pressure cleaning apparatus comprises an input unit which is coupled to the control unit and via which a liquid pressure is predeterminable for the control unit by an operator.

19. The high-pressure cleaning apparatus in accordance with claim 14, wherein the high-pressure cleaning apparatus comprises a display unit at which information associated with the predetermined liquid pressure is displayable to the operator.

20. The high-pressure cleaning apparatus in accordance with claim 19, wherein the input unit and the display unit form or are configured as an integrated input/output unit.

21. The high-pressure cleaning apparatus in accordance with claim 18, wherein information from the input unit to the control unit and/or from the control unit to a display unit of the high-pressure cleaning apparatus is wirelessly transmittable.

22. The high-pressure cleaning apparatus in accordance with claim 18, wherein the high-pressure cleaning apparatus comprises an admixing device for admixing a cleaning chemical, which admixing device comprises a receptacle for a container holding the cleaning chemical, the injector and the supply line which runs from the receptacle to the injector.

23. The high-pressure cleaning apparatus in accordance with claim 18, wherein the operating unit is in flow communication or can be brought in flow communication with the pressure chamber via the high-pressure line and to which is connectable or on which is arranged at least one discharge unit for pressurized liquid, and wherein the operating unit comprises at least one of the input unit and a display unit of the high-pressure cleaning apparatus.

24. The high-pressure cleaning apparatus in accordance with claim 23, wherein a high-pressure nozzle is provided as a first discharge unit and a low-pressure cleaning agent nozzle is provided as a second discharge unit, the first and second discharge units being selectively connectable to the operating unit, and/or wherein the high-pressure cleaning apparatus comprises a discharge device that is arranged on the operating unit or is connectable thereto and which comprises a high-pressure nozzle and a low-pressure cleaning agent nozzle which can be selectively brought into fluid communication with the high-pressure line.

25. The high-pressure cleaning apparatus in accordance with claim 24, wherein, when the low-pressure cleaning agent nozzle is connected or selected in use of the high-pressure cleaning apparatus, a drop in the liquid pressure below a predetermined or predeterminable threshold pressure is detectable and wherein a corresponding indication is providable to the operator at an indicating unit of the high-pressure cleaning apparatus.

26. The high-pressure cleaning apparatus in accordance with claim 25, wherein the indication comprises information that the high-pressure pump is assuming a cleaning agent mode.

27. The high-pressure cleaning apparatus in accordance with claim 26, wherein, when in the cleaning agent mode, a position of the valve unit is regulatable by the operator via the input unit for changing the free cross-sectional area of the return line.

28. The high-pressure cleaning apparatus in accordance with claim 27, wherein the high-pressure cleaning apparatus comprises an admixing device for admixing a cleaning chemical whose mixing ratio with the pressurized liquid is regulatable depending on the position of the valve unit.

29. The high-pressure cleaning apparatus in accordance with claim 27, wherein positions of the valve unit are regulatable in steps or continuously.

30. The high-pressure cleaning apparatus in accordance with claim 27, wherein the indicating unit is a display unit of the high-pressure cleaning apparatus at which information associated with the predetermined position of the valve unit is displayable to the operator.

31. The high-pressure cleaning apparatus in accordance with claim 27, wherein the input unit comprises input elements by which, in the presence of the cleaning agent mode, the position of the valve unit is predeterminable and by which, in the absence of the cleaning agent mode, the liquid pressure is predeterminable.

32. The high-pressure cleaning apparatus in accordance with claim 1, wherein the pump comprises an unloader comprising an unloader valve, and the pump further comprising a control line from the unloader valve opening into the second chamber region, allowing liquid in the second chamber region to apply pressure to the unloader valve.

33. The high-pressure cleaning apparatus in accordance with claim 32, wherein the high-pressure apparatus comprises a switch element coupled to the control unit or a drive motor of the pump, and wherein the unloader valve comprises a valve plunger adapted to actuate the switch element to provide a switch signal, wherein in dependence of the switch signal the drive motor is turned off.

34. A high-pressure cleaning apparatus comprising:
a high-pressure pump, the pump comprising a pump inlet for connecting a supply conduit to supply a liquid, and a pump outlet;
a high-pressure line connected to the pump outlet;
an operating unit comprising a high-pressure gun connected to the high-pressure line;
a drive unit;
a control unit coupled to the drive unit;
a pressure sensor coupled to the control unit;
the pump comprising:
  a suction chamber;
  at least one pump chamber which is arranged downstream of the suction chamber and in which liquid is pressurized;
  a pressure chamber arranged downstream of the pump chamber, with a pressure valve being interposed between the pump chamber and the pressure chamber, the pressure chamber having a first chamber region and a second chamber region downstream thereof, a non-return valve being disposed between the first chamber region and the second chamber region;
  a return line via which the first chamber region of the pressure chamber is in flow communication with the suction chamber; and
  a valve unit by which a free cross-sectional area of the return line is changeable, the drive unit being associated with the valve unit;
wherein:
  a liquid pressure is detectable on the pressure side of the pump chamber by the pressure sensor, and depending on the signal of the pressure sensor, the liquid pressure is controllable to a predetermined or predeterminable liquid pressure by changing of the free cross-sectional area of the return line,
  the high-pressure pump comprises, downstream of the valve unit, at or in the return line, an additional pressure valve which opens the return line when a threshold pressure is exceeded, the additional pressure valve sealingly closing the return line below the threshold pressure, and
  the valve unit comprises a valve body receiving part partially forming the return line and comprises a valve body of the valve unit received therein, and wherein the additional pressure valve is configured as a valve ring surrounding the valve body receiving part.

* * * * *

UNITED STATES PATENT AND TRADEMARK OFFICE
CERTIFICATE OF CORRECTION

PATENT NO. : 10,960,440 B2
APPLICATION NO. : 15/630513
DATED : March 30, 2021
INVENTOR(S) : Kloepfer et al.

Page 1 of 1

It is certified that error appears in the above-identified patent and that said Letters Patent is hereby corrected as shown below:

In the Claims

At Column 18, Claim 19, Line 33, the text "with claim 14, wherein" should be changed to -- with claim 18, wherein --

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*